United States Patent
Meah et al.

(10) Patent No.: US 10,614,705 B2
(45) Date of Patent: *Apr. 7, 2020

(54) DETECTOR SYSTEM

(71) Applicant: Tyco Fire & Security GmbH, Neuhausen am Rheinfall (CH)

(72) Inventors: Faruk Meah, Woking (GB); Andrew D. Naish, Staines (GB); Steven Ian Bennett, Sunbury (GB)

(73) Assignee: Johnson Controls Fire Protection LP, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,460

(22) Filed: Nov. 13, 2017

(65) Prior Publication Data

US 2018/0068556 A1 Mar. 8, 2018

Related U.S. Application Data

(62) Division of application No. 13/877,045, filed as application No. PCT/GB2011/001445 on Oct. 4, 2011, now Pat. No. 9,847,019.

(30) Foreign Application Priority Data

Oct. 4, 2010 (GB) .................................. 1016681.7

(51) Int. Cl.
*G08C 17/00* (2006.01)
*G08C 23/04* (2006.01)
(Continued)

(52) U.S. Cl.
CPC ........... *G08C 23/04* (2013.01); *G08B 29/145* (2013.01); *H04B 10/1143* (2013.01)

(58) Field of Classification Search
CPC ... G08C 23/04; G08B 29/145; H04B 10/1143
(Continued)

(56) References Cited

U.S. PATENT DOCUMENTS 4,338,494 A * 7/1982 Theis .................. H04M 3/5166
369/29.01
4,531,114 A 7/1985 Topol et al.
(Continued)

FOREIGN PATENT DOCUMENTS

EP 0 180 423 A2 5/1986
EP 0 434 089 A1 6/1991
(Continued)

OTHER PUBLICATIONS

European Search Report completed Apr. 10, 2017, from European Patent Application No. 17 15 0897, filed Oct. 10, 2011. Two pages.
(Continued)

*Primary Examiner* — Zhen Y Wu
(74) *Attorney, Agent, or Firm* — HoustonHogle LLP

(57) ABSTRACT

The system includes an active unit, such as a detector unit, which has a processor, a network port for connection to a central control unit, and an optical data input port. The processor is arranged to enable the optical data input port on receipt of an enable signal received by the active unit from the central control unit via a network.

20 Claims, 10 Drawing Sheets

System level overview block diagram

(51) Int. Cl.
*H04B 10/114* (2013.01)
*G08B 29/14* (2006.01)

(58) Field of Classification Search
USPC .................................................. 340/870.28
See application file for complete search history.

(56) References Cited

U.S. PATENT DOCUMENTS

| | | | |
|---|---|---|---|
| 4,577,184 A | 3/1986 | Hodara et al. | |
| 5,285,323 A * | 2/1994 | Hetherington | G06F 12/0897 345/519 |
| 5,355,462 A * | 10/1994 | Rousseau | G06F 9/342 711/215 |
| 5,383,043 A * | 1/1995 | Su | H04B 10/114 340/5.73 |
| 5,483,687 A * | 1/1996 | Barrett, Jr. | H03J 1/005 327/91 |
| 5,546,071 A | 8/1996 | Zdunich | |
| 5,589,859 A * | 12/1996 | Schantz | B41J 25/34 347/19 |
| 5,939,699 A | 8/1999 | Perttunen et al. | |
| 6,049,869 A * | 4/2000 | Pickhardt | G06F 16/90344 712/300 |
| 6,118,996 A * | 9/2000 | Kowaguchi | H04W 68/12 455/422.1 |
| 6,748,556 B1 | 6/2004 | Storino et al. | |
| 7,161,483 B2 * | 1/2007 | Chung | H04L 12/2803 340/12.53 |
| 7,498,949 B2 * | 3/2009 | Ito | G08B 29/145 250/574 |
| 7,675,444 B1 * | 3/2010 | Smith | H04L 25/0266 341/141 |
| 7,983,563 B1 * | 7/2011 | Uhlhorn | H04J 14/005 398/78 |
| 8,334,785 B1 * | 12/2012 | Zetts | G08B 7/064 340/309.16 |
| 8,428,153 B2 * | 4/2013 | Burns | G08B 3/10 375/238 |
| 2002/0021224 A1 * | 2/2002 | Schneider | G08B 29/145 340/628 |
| 2002/0126016 A1 * | 9/2002 | Sipp | G08B 17/10 340/628 |
| 2003/0001727 A1 | 1/2003 | Steinmark | |
| 2003/0234732 A1 | 12/2003 | Rhodes et al. | |
| 2004/0112114 A1 * | 6/2004 | Penney | G08B 29/145 73/1.01 |
| 2004/0183675 A1 * | 9/2004 | Harris | G01D 9/005 340/539.13 |
| 2005/0096753 A1 | 5/2005 | Arling et al. | |
| 2005/0150952 A1 | 7/2005 | Chung | |
| 2005/0169321 A1 | 8/2005 | Farley et al. | |
| 2006/0013199 A1 * | 1/2006 | Boora | H04L 47/10 370/352 |
| 2006/0019670 A1 * | 1/2006 | Joung | H04W 48/08 455/450 |
| 2006/0089118 A1 | 4/2006 | Whitehouse | |
| 2006/0098956 A1 * | 5/2006 | Wang | H04N 5/85 386/231 |
| 2006/0200682 A1 * | 9/2006 | Hars | G06F 11/3656 713/193 |
| 2006/0227032 A1 | 10/2006 | Vidal | |
| 2007/0046467 A1 * | 3/2007 | Chakraborty | G06K 7/0008 340/572.1 |
| 2007/0091925 A1 * | 4/2007 | Miyazaki | H04B 3/542 370/469 |
| 2007/0115110 A1 * | 5/2007 | Ito | G08B 29/145 340/506 |
| 2007/0176766 A1 * | 8/2007 | Cheng | G08B 17/10 340/527 |
| 2007/0241926 A1 | 10/2007 | Chen et al. | |
| 2008/0005440 A1 * | 1/2008 | Li | H04B 1/207 710/303 |
| 2008/0014917 A1 * | 1/2008 | Rhoads | G06F 3/017 455/422.1 |
| 2008/0068156 A1 * | 3/2008 | Shimokawa | H04W 84/18 340/539.22 |
| 2008/0260391 A1 | 10/2008 | Asukai et al. | |
| 2008/0316164 A1 | 12/2008 | Tan | |
| 2009/0012882 A1 * | 1/2009 | Sarangapani | G01C 21/32 705/28 |
| 2009/0023440 A1 * | 1/2009 | Saotome | H04L 47/10 455/424 |
| 2010/0028015 A1 * | 2/2010 | Hosking | H04B 10/40 398/135 |
| 2010/0078482 A1 | 4/2010 | Bradford | |
| 2010/0171592 A1 | 7/2010 | Kamemaru | |
| 2010/0201488 A1 | 8/2010 | Stern et al. | |
| 2010/0280636 A1 * | 11/2010 | Holland | H04L 12/2816 700/90 |
| 2010/0302025 A1 * | 12/2010 | Script | G01P 15/09 340/539.1 |
| 2011/0019748 A1 * | 1/2011 | Burns | G08B 3/10 375/242 |
| 2011/0187206 A1 * | 8/2011 | Hart | G01D 4/02 307/328 |
| 2012/0033977 A1 * | 2/2012 | Yang | H04B 10/25 398/115 |
| 2012/0075092 A1 * | 3/2012 | Petite | G08B 25/009 340/539.1 |
| 2012/0201326 A1 * | 8/2012 | Burns | G08B 25/04 375/295 |
| 2013/0016355 A1 * | 1/2013 | Landry | G01N 21/534 356/442 |
| 2013/0066571 A1 * | 3/2013 | Chamarti | G01D 4/00 702/62 |
| 2013/0181813 A1 * | 7/2013 | Norlen | G08C 19/16 340/9.1 |
| 2013/0300579 A1 | 11/2013 | Meah et al. | |

FOREIGN PATENT DOCUMENTS

| | | |
|---|---|---|
| EP | 2 339 553 A1 | 6/2011 |
| GB | 2 451 059 B | 8/2009 |
| JP | S62144437 A | 6/1987 |
| JP | H0330096 A | 2/1991 |
| JP | 03030096 B2 | 4/2000 |
| WO | 02/054366 A1 | 7/2002 |

OTHER PUBLICATIONS

European Search Report completed Apr. 7, 2017, from European Patent Application No. 17 15 0899, filed Oct. 4, 2011. Two pages.
Solis, I., et al. "FLIP: A Flexible Interconnection Protocol for Heterogeneous Internetworking," Mobile Networks and Applications, 9(4): 347-361 (2004).
International Preliminary Report on Patentability, dated Apr. 9, 2013, from International Application No. PCT/GB2011/001445, filed on Oct. 4, 2011. 11 pages.
Great Britain Search Report, dated Jan. 25, 2011, for GB Application No. GB1016681.7, filed Oct. 4, 2010. One page.
Great Britain Further Search Report, dated Oct. 27, 2011, for GB Application No. GB1016681.7, filed Oct. 4, 2010. Two pages.
Great Britain Further Search Report, dated Oct. 28, 2011, for GB Application No. GB1016681.7, filed Oct. 4, 2010. One page.
Great Britain Further Search Report, dated Oct. 31, 2011, for GB Application No. GB1016681.7, filed Oct. 4, 2010. One page.
International Search Report and the Written Opinion of the International Searching Authority, dated May 30, 2012, from International Application No. PCT/GB2011/001445, filed on Oct. 4, 2011. Sixteen pages.

* cited by examiner

Block diagram of IR link modules

Block diagram of Control and Indicating Equipment

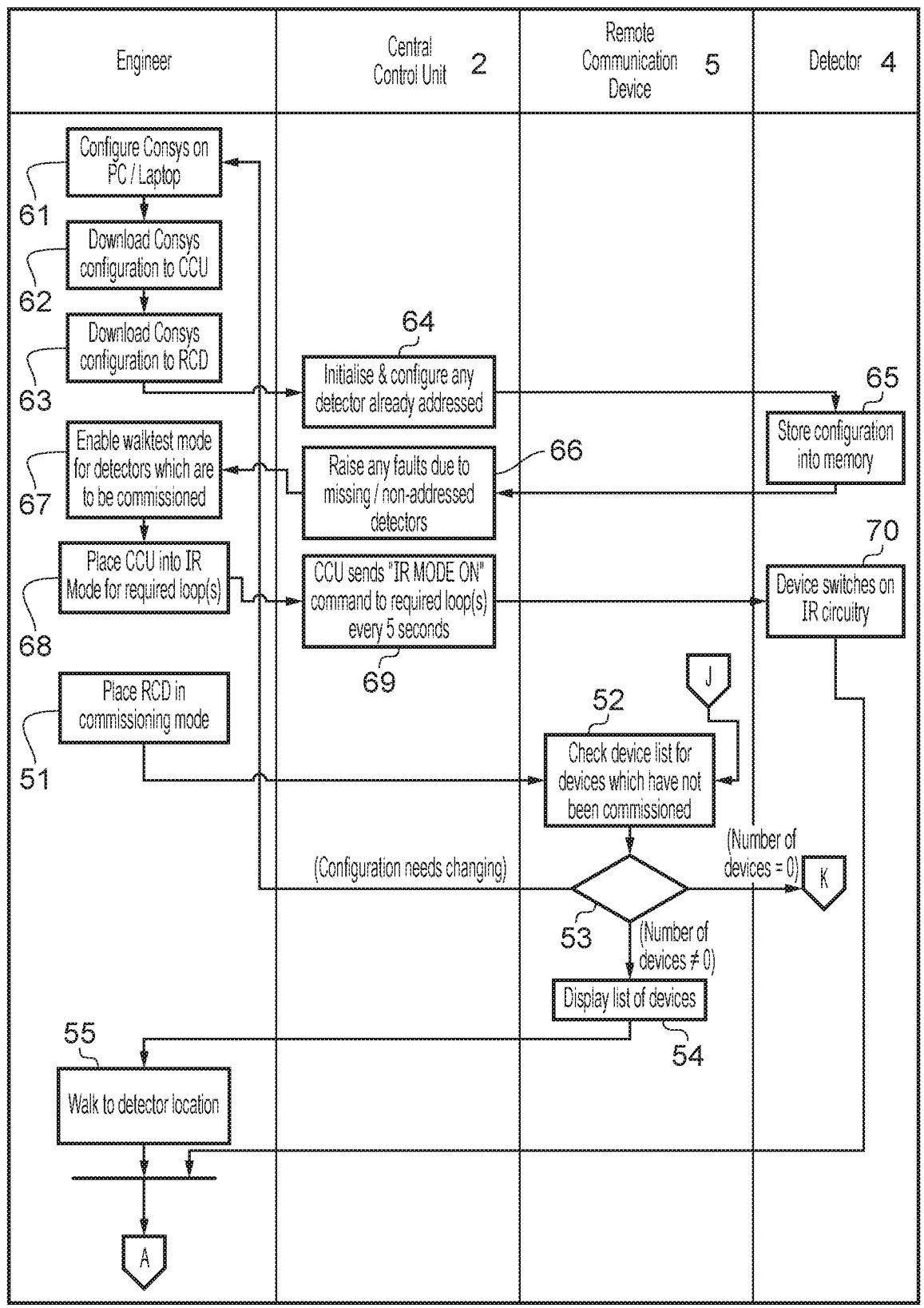
FIG. 6.1

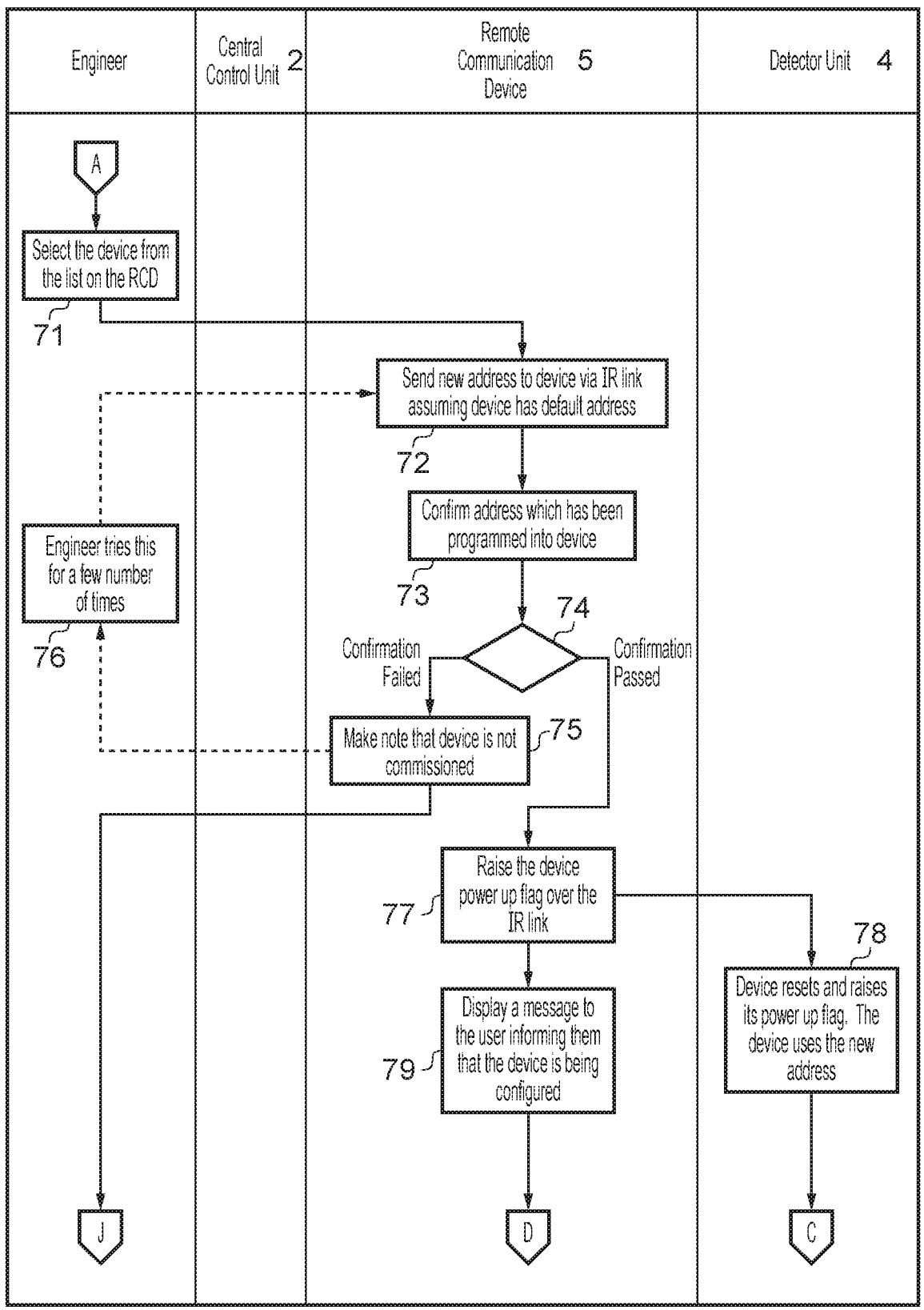
FIG. 6.2

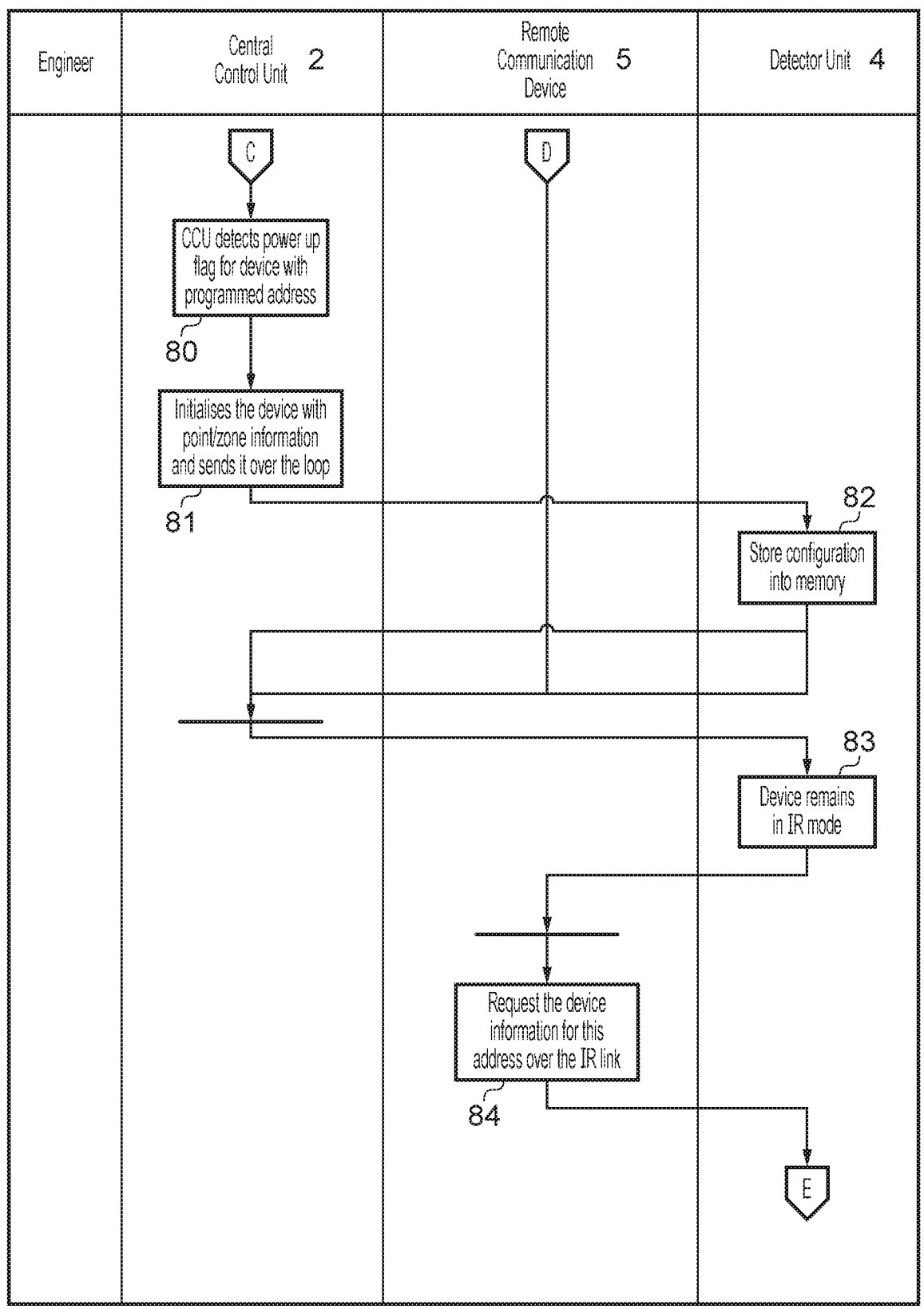
FIG. 6.3

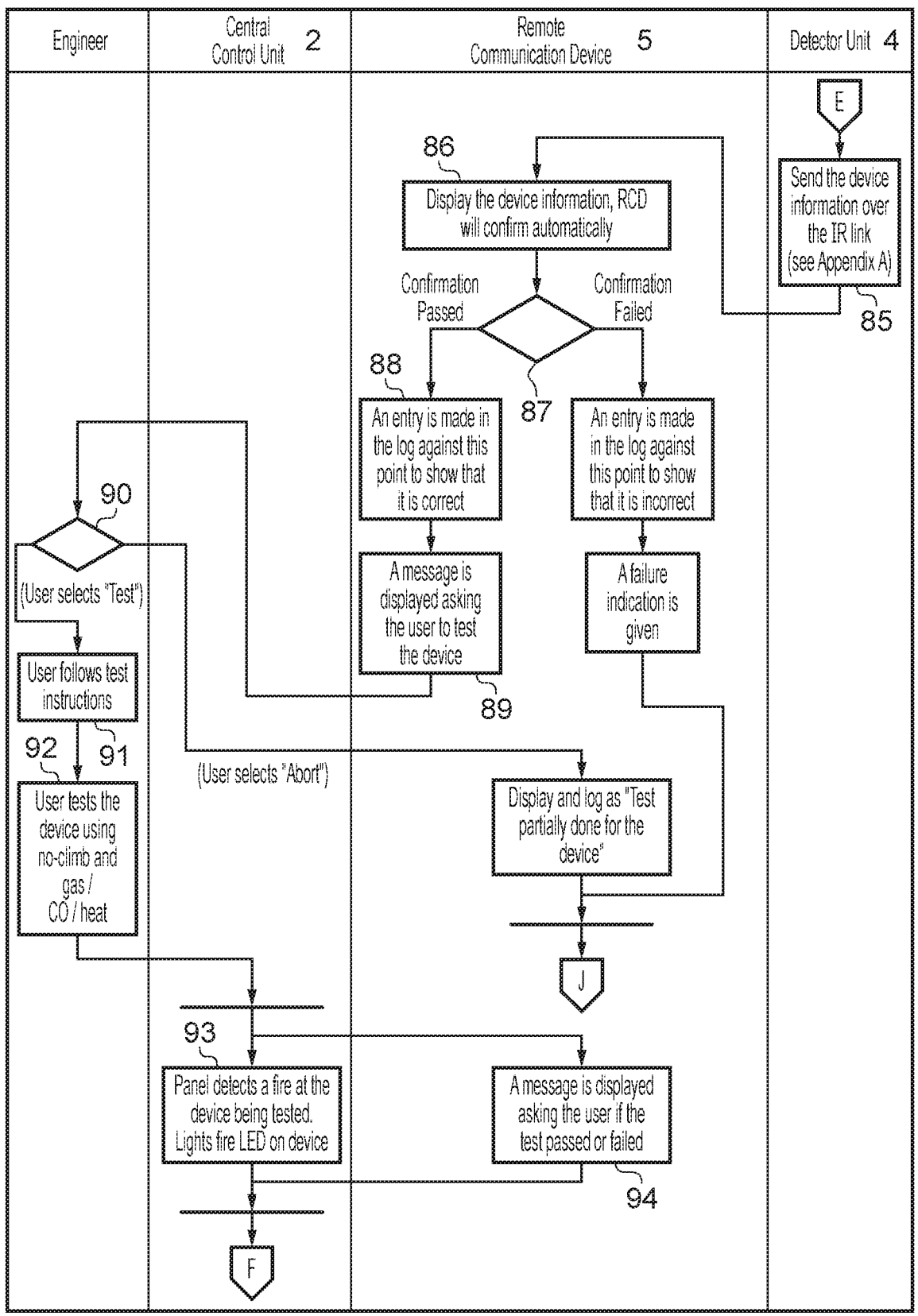
FIG. 6.4

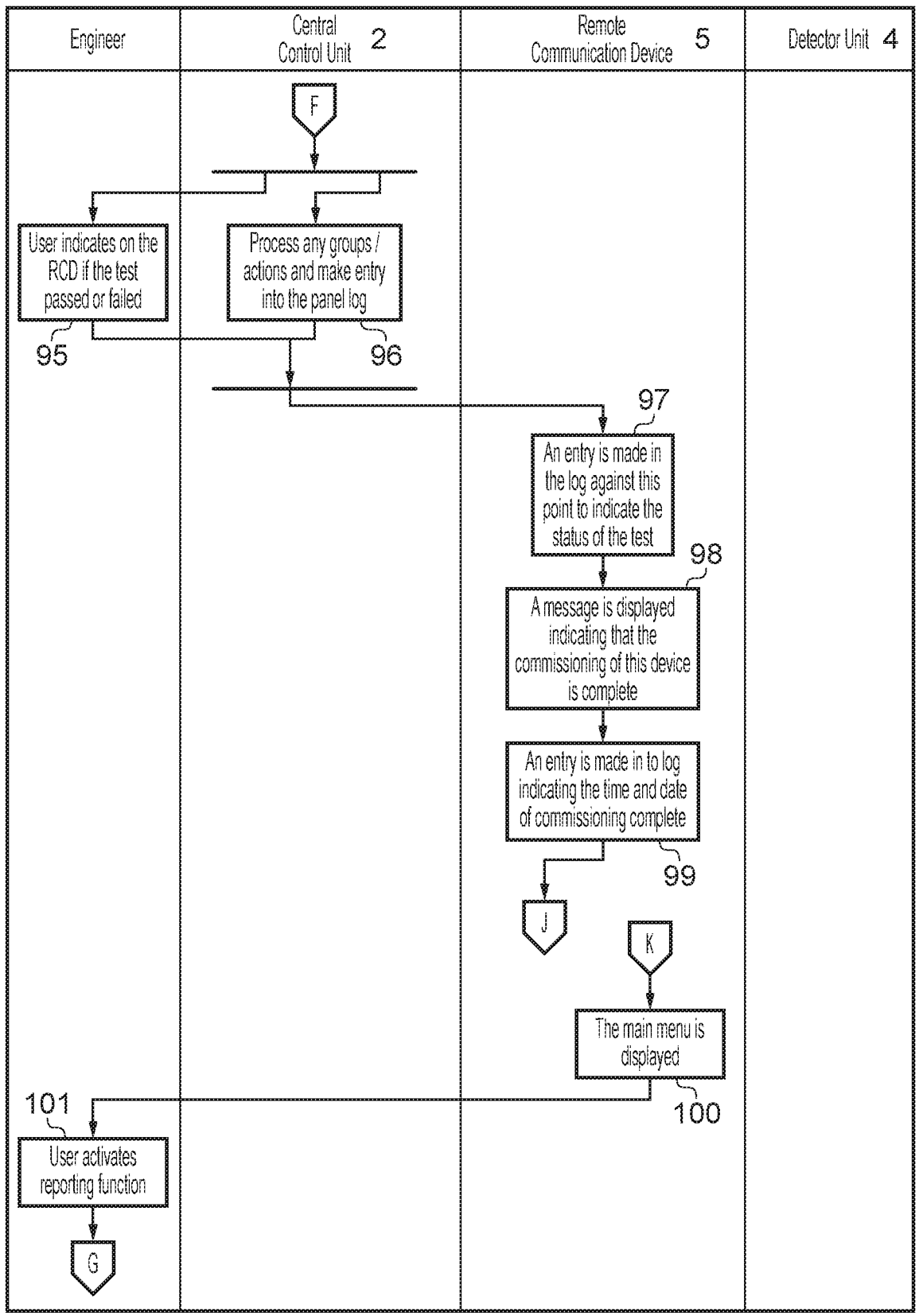
FIG. 6.5

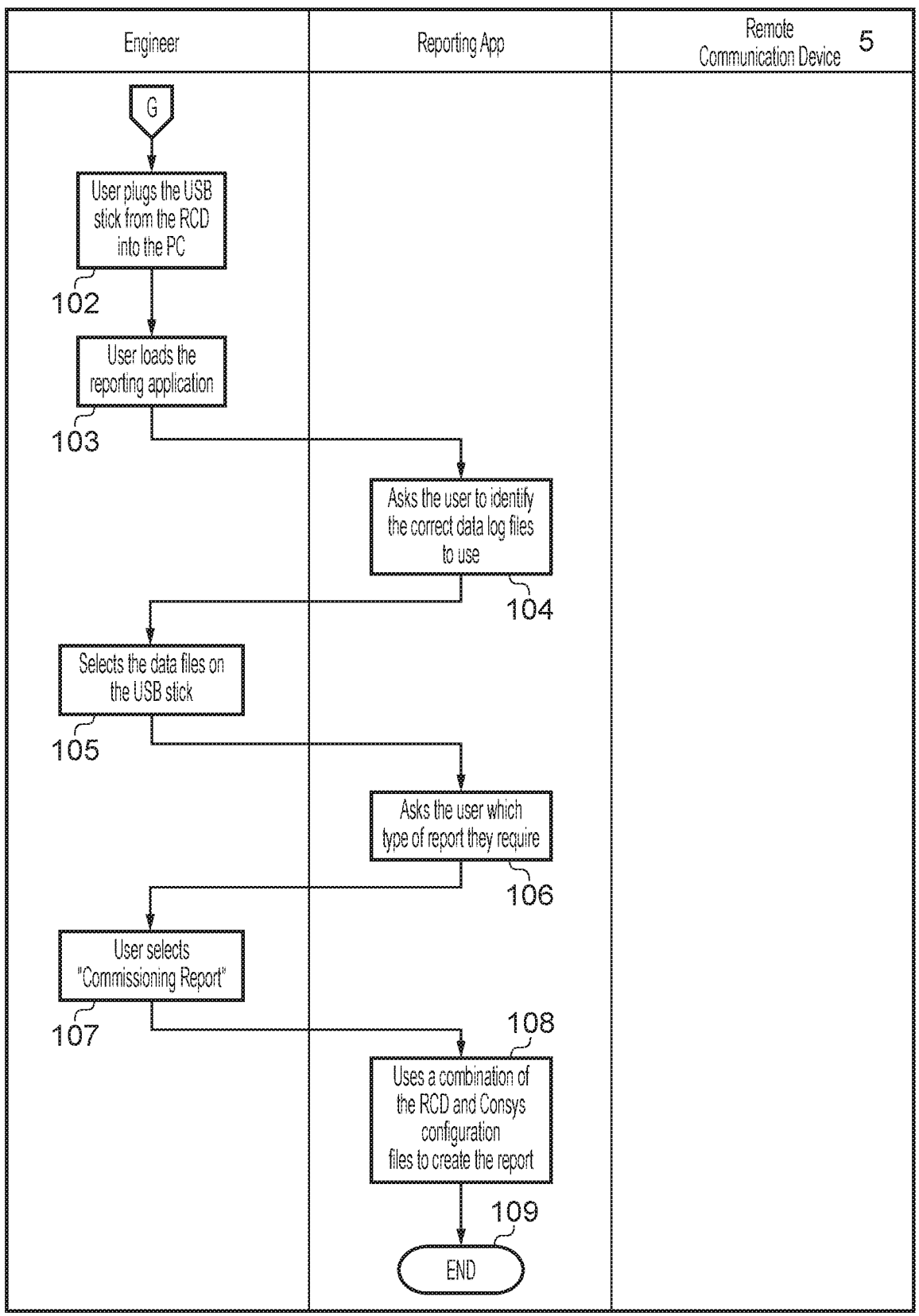
FIG. 6.6

DETECTOR SYSTEM

RELATED APPLICATIONS

This application is a Divisional of U.S. patent application Ser. No. 13/877,045, filed on Aug. 2, 2013, which is a § 371 National Phase Application of International Application No. PCT/GB2011/001445, filed on Oct. 4, 2011, which claims priority to United Kingdom Application No. 1016681.7, filed on Oct. 4, 2010.

All of the afore-mentioned applications are incorporated herein by this reference in their entirety.

BACKGROUND OF THE INVENTION

The present invention relates to detector units of detector systems, such as fire alarm systems, to the detector system as a whole, to a remote communication device, and to associated methods of operation.

Modern fire alarm systems include a number of fire detector units and ancillary units which are connected to a common wired network together with a central control unit to which the network and all of the detectors and other ancillaries are connected. The central control unit in this specification is control and indicating equipment which instructs each fire detector unit and ancillary unit to perform various tasks during commissioning of the system, maintenance or diagnostic testing, and which controls the alarm system and the various units on the system. The fire detector and ancillary units are normally connected to the central control unit on one or more circuits or loops, with each end of the circuit terminating at the central control unit. Thus, if the circuit is broken at any one point, power and control signals can still reach every detector or ancillary unit because each end of the circuit is connected to the central control unit. Alternatively, the detector and ancillary units can be connected to the central control unit radially, or in other ways, such as a spur.

There are a number of operations which the central control unit instructs the detector units and ancillary units to perform. These can include putting units in different operating modes, activation of self test routines, programming the unit with a unique device identification and ancillary functions such as switch control.

It may be necessary for manual interaction with the units so as to facilitate or confirm operation of each unit's functions. For example, automated addressing algorithms from the central control unit can be used to uniquely identify and communicate with units on a wired network, but they may not be able to identify the physical location of each unit. During the commissioning process, in which the system is initially set up for correct functioning, an operator is required to be in a position near to the individual units. During the commissioning process, as well as testing the operation of the individual units, the nearby operator will need to identify the location of each unit. This normally requires a second operator at the central control unit who will send commands through the wired network to the unit near to the nearby operator such that a visible LED on the casing of the unit is caused to flash. The nearby operator must then communicate the location of the unit back to the operator at the central control unit perhaps by telephone or radio. The operator at the central control unit can then enter or confirm a pre-programmed location of the unit, for example "Conference Room 2" and send this through the wired network to the unit concerned where the location is stored in memory.

An alternative method exists in which a single operator carries a portable tool which he carries around the building so that, when he reaches a unit, he removes it from its mounting and connects it to the portable tool and uses the tool to write the location of the unit into the unit's memory. He then replaces the unit into its housing. This system has a number of problems in that units tend to be located in places which are difficult to access, such as high up on ceilings and in roof voids which require the use of specialist removal, climbing or lifting equipment to obtain access. This adds to the resources which are required to commission a system, and are time consuming, thereby incurring high commissioning, maintenance and diagnostic costs.

It has been proposed that remote devices are used to communicate with the units based on radio frequency (RF) signals, but there are a number of problems associated with this. Firstly, RF signals propagate over long distances and lack directionality. Thus, any signal which is emitted from the remote device is likely to be received by several units within the building. Also, many other devices operate using RF signals, meaning that there is a possibility of interference between the systems. It would be very undesirable for a unit to receive a signal from another system which causes it to enter a test mode whereby, if it were to detect the presence of a fire, it would not set off an alarm signal. It would also be undesirable if the remote device were to succeed in programming more than one unit at a time, when it is only intended to be used to program one of them. RF systems also tend to be very expensive.

Reference is made to 'detector systems'. In the specification, this term includes systems, such as fire alarm systems, emergency alarm systems, intruder alarm systems and the like. The systems include a number of active units which are networked together, often on a circuit. The term 'active units' includes detector units for detecting whatever it is that the system is designed to detect, as well as ancillary units having different functions, such as sounders for generating an audible alarm, flashing beacons which provide a visual alarm, isolator units which can be used to isolate parts of a detector circuit, alarm activation buttons or switches, and the like. Where it is a fire detector system, the detector unit might be a smoke detector, heat detector, flame detector or the like. Where the detector system is an emergency detector system, it will include suitable detectors for detecting an emergency, such as the presence of toxic gases, the presence of radioactivity, or some other suitable indicator of an emergency. In the case of an intrusion detector system, the detector units might be movement detectors, heat detectors, pressure sensors, and the like.

SUMMARY OF THE INVENTION

The present invention aims to address some of these problems.

According to a first aspect of the present invention, an active unit of a networked detector system comprises: a processor; a network port for connection to a central control unit; an optical data input port arranged to receive optical data, wherein the processor is arranged to enable the optical data input port on receipt of an enable signal received by the active unit from the central control unit via the network.

By enabling the optical data input port only when it is required, for example while the system is being commissioned, maintained, or diagnosed, the possibility of interference from other optical sources is less likely to have an effect on the active unit. Additionally, the use of optical data reduces the likelihood of large numbers of active units being addressed by a remote communication tool. Optical signals are much more directional than RF signals.

Preferably, the active unit further comprises an optical data output port arranged to transmit optical data. This permits the active unit to transmit data, for example, to a remote communication tool. Alternatively, the optical data output port might be an LED which permits the operator of a remote communication tool to be notified that the optical data has been safely received by the active unit and, perhaps, acted upon.

Advantageously, the active unit further comprises a multiplexer which selects data from the optical data input port or the network port. It will be appreciated that the active unit can be addressed both by the central control unit via the network port, and optically via the optical data input port. In some embodiments, the active unit may be able to receive and act upon data received both via the network port and by the optical data input port, but other systems will only be able to receive data from either the optical data input port or the network port at any particular moment. The multiplexer may be arranged to assign a higher priority to data received from the optical data input port than from the network port.

The multiplexer is preferably ranged to select data from the optical data input port when data is received from the optical data input port and data from the network port when it is not.

It is also advantageous for the active unit to include a watchdog unit arranged to monitor received optical data, and if more than a predetermined amount of data is received which is not recognised as data relating to the active unit, the optical data output port is disabled.

The watchdog unit is intended to reduce the likelihood of other optical sources interfering with the detector unit.

It is also preferred that the active unit include an optical signal detector which detects the presence of optical signals received by the optical data input port further, the active unit may include a logic unit which is arranged to control the multiplexer, the logic unit including a first input for receiving the optical port enable signal and a second input for receiving a signal indicating if an optical signal is being received, and wherein the logic unit is arranged to control the multiplexer to select data from the optical port when both the optical port is enabled and an optical signal is received.

It is preferred that the optical data output port is an infra-red (IR) port, and the optical data is IR data.

According to a second aspect of the invention, a detector system includes the active unit according to the first aspect of the invention and a remote communication device including an optical data output port arranged to transmit optical data. Preferably, that remote communication device further includes an optical data input port arranged to receive optical data.

The remote communication device can be used to communicate with the active unit.

In one embodiment, the remote communication device further includes a processor unit arranged to generate data for transmission from the optical data output port of the remote communication device. This permits it to communicate with the active unit. The remote communication device further comprises a display. If the active unit emits a reply, this can be viewed on the display.

According to a third aspect of the present invention, a detector system comprises an active unit according to the first aspect of the invention and a central control unit having a network port for communication to the active unit via the detector network, the central control unit having an optical data port enabler arranged to generate an enablement signal which is communicated to the active unit via the detector network. This enables an operator to generate an enablement signal to activate the optical data ports of some or all of the active units while the system is being commissioned, maintained or diagnosed.

The central control unit further includes a disabler which is able to generate a disablement signal for communication to the active unit(s) via the detector network. This allows the operator to turn the optical data ports off when they are not required.

According to a fourth aspect of the present invention, a remote communication device arranged to communicate with an active unit of a networked detector system which has an optical data input port includes an optical data output port arranged to transmit optical data; and an optical data input port arranged to receive optical data. The input and output port may be a single component.

The remote communication device preferably also includes a processor unit arranged to generate data for transmission from the optical data output port of the remote communication device. The remote communication device might also include a display.

According to a fifth aspect of the invention, a method of communicating with an active unit of a detector network, wherein the active unit includes an optical data input port, comprises the steps of: 1. generating an optical data input port enablement signal at a central control unit which is arranged on the detector network; 2. receiving the optical data input port enablement signal in the active unit; and 3. enabling the optical data input port of the active unit.

Preferably, the method further comprises receiving an optical data input signal via the optical data input port. Preferably, the method also includes transmitting optical data from the optical data output port of the active unit.

According to a sixth aspect of the present application, a method of selecting one active unit to communicate with from a plurality of active units on a networked detector system, each active unit including an optical data input port for receiving optical data, the method comprising the steps of: 1. transmitting an optical initiation signed towards the active unit to be selected; 2. receiving optical handshake signals from the plurality of active units; and 3. selecting the optical signal from the active unit to be selected.

In this way, if the optical initiation signal is received by multiple active units, each of those active units will send an optical handshake signal which allows a particular active unit to be selected based on the optical handshake signal from the active unit.

The optical initiation data may be transmitted from a remote communication device. Preferably, the optical handshake signals from the plurality of active units differ from each other, for example by including the address information identifying the active unit that has sent it.

Preferably the optical data input port of each active unit is an IR port.

It is preferred that the remote communication device includes a selector by which the active unit can be selected, and that the selector can be a key, a button or an icon which is operated to select the active unit. Alternatively, or in addition, the selector includes a display which is arranged to display the handshake signals from the active units, from which the active unit may be selected.

In one embodiment, the plurality of active units each include a visible LED which transmits the optical handshake signal for that detector.

According to a seventh aspect of the present invention, an active unit comprises an optical data input port for receiving optical signals; a processor arranged to identify an initiation signal from the received optical signal; and an optical signal output port arranged to emit an optical handshake signal when an initiation signal is received.

The optical signal output port may be an LED, and the active unit may include a memory which stores the handshake signal. The handshake signal may be a unique identifier of the active unit, perhaps including the network address of the active unit.

According to an eighth aspect of the present invention, a remote communication device arranged to communicate with a selected one of a plurality of active units comprises a processor arranged to generate an initiation signal; an optical data output port arranged to emit the initiation signal; an optical data input port arranged to receive a plurality of handshake signals from the plurality of active units; a selector operable to select one of the active units from which a handshake signal is received.

The selector may be a key, button or icon which is operated to select the active unit. The device may also include a display which is arranged to display the handshake signals from the active units from which the active unit may be selected. Preferably, the optical data output ports and the optical data input port are IR ports.

According to the ninth aspect of the invention, a detector system comprises an active unit having an optical data input port for receiving optical signals; a processor; an optical signal output port; and a remote communication device arranged to communicate with a selected one of a plurality of active units including a processor arranged to generate an initiation signal and an optical data output port arranged to emit the initiation signal; wherein the processor of the active unit is arranged to identify the initiation signal from the received optical signal and the optical signal output port is arranged to emit an optical handshake signal when the initiation data is received.

According to a tenth aspect of the present invention an active unit of a network safety system comprises a protocol decoder; a network port for connection to a central control unit; an optical data input port arranged to receive optical data; a multiplexer which receives data both from the network port and from the optical data input port and passes the data to the protocol decoder, wherein the protocol decoder is arranged to apply the same protocol decoding process to data from both the network port and the optical data input port.

By using a common protocol between the optical data from the optical data input port and the data from the network port, the two sets of signals can be handled in exactly the same way requiring a single protocol decoder. It is surprising that this is possible, because it would be expected that the data transmission rate through an optical data system would be much less than a wired system because of the potential level of interference, reflections and the like when communicating remotely using an optical signal. Normally, optical signals are transmitted at a very low data transfer rate which would be incompatible with the data transmitted over a wired data network, and so two different protocol decoders would have been expected, but by using the same protocol, a single protocol decoder can be used. This makes the system significantly cheaper and makes operation of the detector unit simpler.

Preferably, the optical data input port is an IR port.

Additionally, the active unit may include a processor which operates on the decoded data from the protocol decoder, and the protocol decoder may be part of the processor.

Preferably, the multiplexer assigns a higher priority to data received from the optical data input port than from the network port. This may be important where the active unit can only handle data from one of the ports at a time.

The active unit may also comprise an optical data output port arranged to transmit optical data, and a de-multiplexer which is arranged to receive data from the protocol decoder and to pass it to the network port or to the optical data output port, as appropriate. Thus, the active unit can communicate both with the central control unit and any remote communication device.

According to an eleventh aspect of the invention, a detector system comprises an active unit according to any one of the preceding claims; a remote communication device including an optical data output port arranged to transmit optical data, and a protocol encoder which generates optical data configured to use the same protocol as data received by the active unit via the network port.

The optical data output port may be an IR port, and the remote communication device may include an optical data input port arranged to receive optical data.

According to a twelfth output of the invention, a method of receiving data from a network and from an optical data input port by an active unit having a network data port, a protocol decoder and a multiplexer, comprises receiving data both from the network port and from the optical data input port; passing the data to the protocol decoder; decoding the data in the protocol decoder by applying the same protocol decoding process to data from both the network port and the optical data input port.

Preferably the method further includes the steps of generating optical data configured to use the same protocol as data received by the active unit via the network port in a protocol encoder of a remote communication device; and transmitting the optical data from an optical data output port in the remote communication device.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 6 is a flow diagram, split into parts 6.1 to 6.6, showing the process of commissioning a system or a part of a system.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
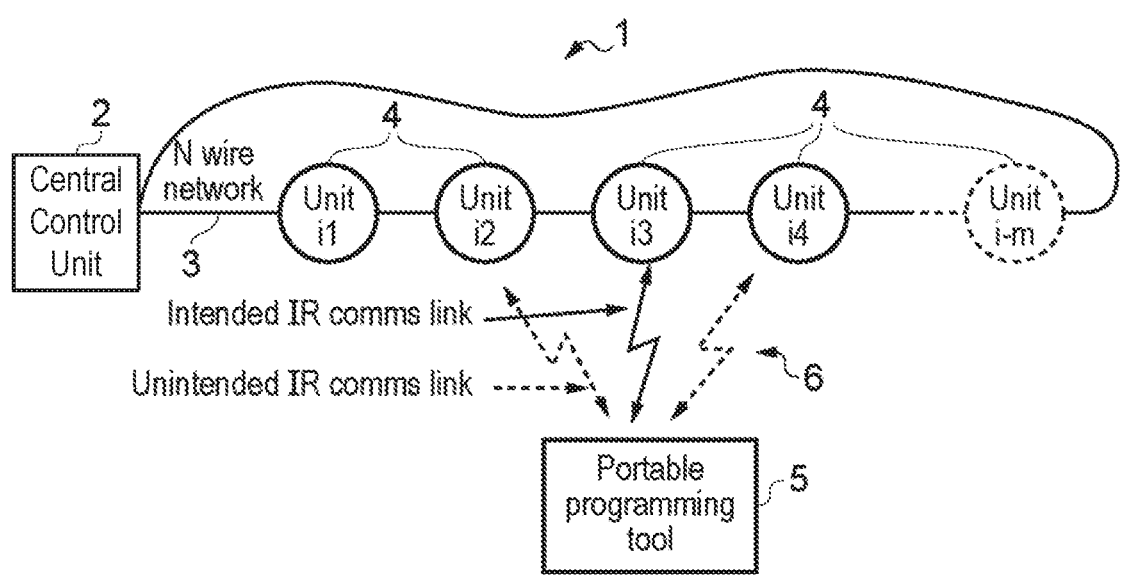
FIG. 1 is a block diagram showing a detector system according to the present invention.

Referring first to FIG. 1, a detector system 1 is shown including a central control unit 2, a wired network 3 which connects the central control unit 2 to a plurality of detector units 4. The wired network 3 is normally in the form of a circuit or loop, with each end of the network connected together back at the central control unit 2. Multiple detector units 4 can be carried on the wire network 3, and in FIG. 1, these are labelled unit i1, i2, i3, i4, . . . , i-m. Alternatively, these units can be connected in parallel, or as a spur. The wire network 3 supplies power to each of the detector units 4, as well as acting as a communication network.

The system also includes a remote communication device 5 which can communicate directly with the detector units 4 by use of an IR communication link 6. In this case, the remote communication device 5 is intended to communicate with unit i3, but there is unintended communication with units i2 and i4 as well, because they are in close proximity. Units which are not in close proximity will not be affected.

Figure 2:
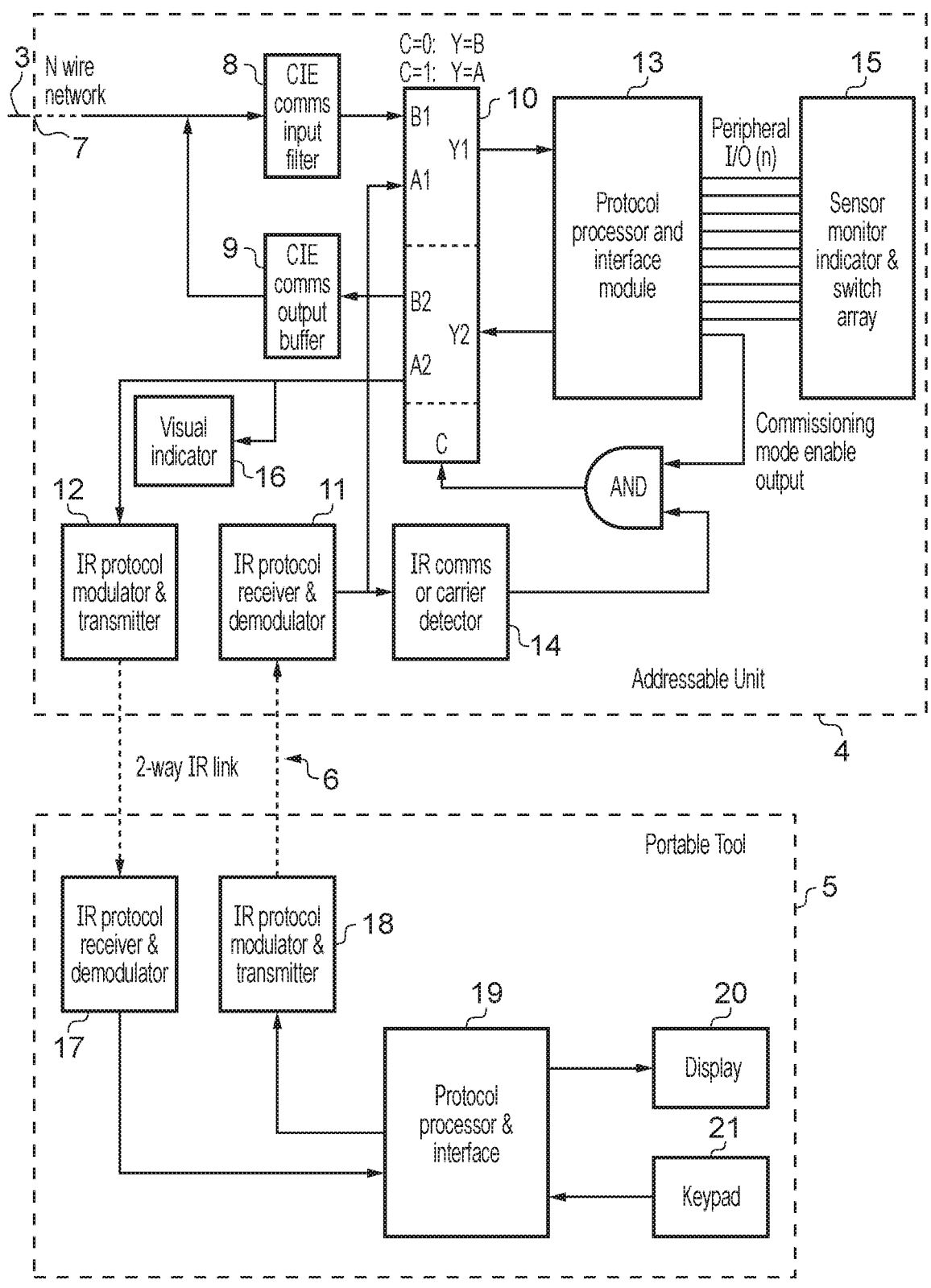
FIG. 2 is a block diagram showing a detector unit in communication with a remote communication device.

Referring now to FIG. 2, a detector unit 4 and a remote communication device 5 are shown schematically in block form with an IR communication link 6 between them.

Referring first to the detector unit 4, it will be seen that it is connected to the wire network 3. The point at which the wire network 3 enters the detector unit forms a network data port 7. Of course, that network brings not only data communication, but also power to drive the detector unit 4. Data received from the central control unit 2 via the network data port 7 is passed to a wired network input filter 8, and outgoing data being passed to the wired network via the network data port 7 comes from a wired network output filter 9. The filters 8 and 9 are connected to a multiplexer/demultiplexer 10. The multiplexer/demultiplexer 10 also receives data from an IR receiver 11 and directs data to an IR transmitter 12.

Data received by the multiplexer/demultiplexer 10 from the network data port or from the IR receiver is directed to a processor unit 13 and data sent from the processor unit 13 is directed to the multiplexer/demultiplexer 10 which directs it to the network data port 7 or the IR transmitter 12, as appropriate. The multiplexer/demultiplexer 10 selects which of the incoming signals from the network data port 7 and the IR receiver 11 it will pass to the processor 13, and which one of the network data port 7 and IR transmitter 12 that it will send outgoing data to based on a chip select/enable signal received at input C. The IR receiver and transmitter can be switched on and off based on whether the IR receiver and transmitter are enabled. This is determined by a signal from the processor unit 13, as well as a signal from an IR communications or carrier detector 14 which are passed to an AND gate. When both signals are high or '1', the multiplexer/demultiplexer 10 routes messages to and from the 'IR receiver 11 and IR transmitter 12. The IR communications or carrier detector 14 monitors the IR receiver 11 such that, as soon as the IR receiver 11 receives an IR signal, it sends a high or "1" signal to the AND gate for a period of time, in this case two seconds. This gives the multiplexer 10 sufficient time to receive and forward the data received by the IR receiver 11 to the processor unit 13. This also gives the processor sufficient time to send any reply signal to the IR transmitter 12 before the multiplexer returns to communicating with the network port 7.

The detector unit 4 also includes a sensor, monitor, indicator and switch array 15 and a visual indicator 16, such as a visible LED. The remote communication device is also shown and includes an IR receiver 17 and an IR transmitter 18. These are connected to a device processor unit 19, which is also connected to a display 20 and a keypad 21. Any appropriate user interface is possible here. The display could include active areas, like on a PDA, which can be touched to make selections or to enter data. The remote communication device 5 is able to transmit data from the IR transmitter 18 to the IR receiver 11 of the detector unit 4, and the IR transmitter 12 of the detector unit 4 is able to transmit data to the IR receiver 17 of the remote communication device 5.

Figure 3:
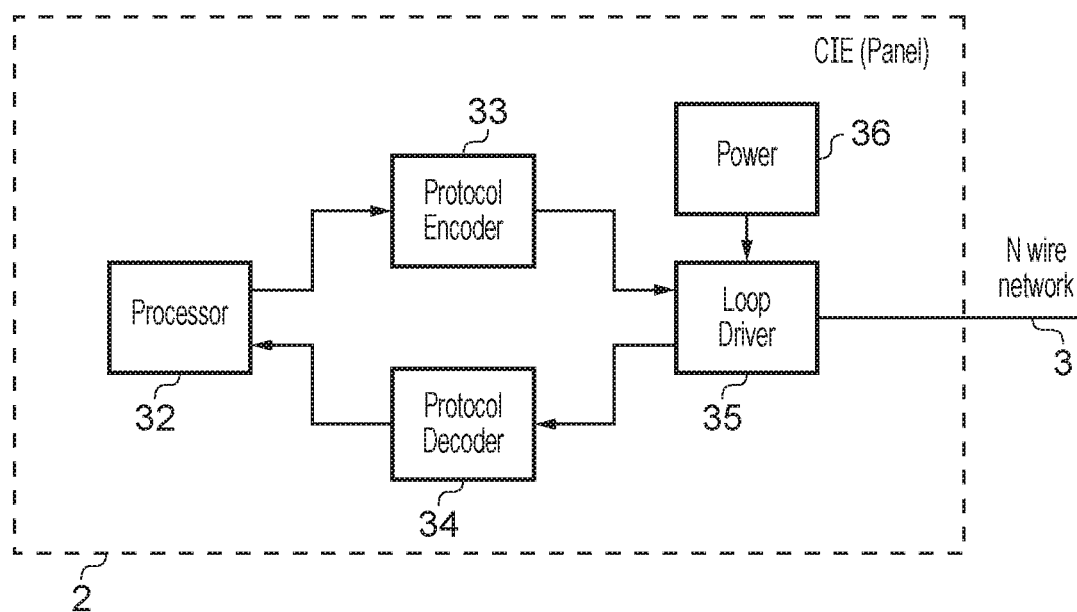
FIG. 3 is a block diagram showing a central control unit.

FIG. 3 shows a central control unit 2 schematically. It is connected to the wired network 3, and includes a panel processor 32 which is connected to a protocol encoder 33 and a protocol decoder 34. Each of these is connected to a loop driver 35 which is powered by a power supply 36, and connected to the wired network 3. When the processor sends data or a command to a detector unit 4, the data is sent to the protocol encoder 33 which encodes it into a format ready for transmission through the wired network 3 via the loop driver 35. When a data signal is received by the central control unit 2, it is received by the loop driver 35 which directs it to the protocol decoder 34 which decodes the data into a form in which the processor 32 can understand. The signal or data passing through the wired network 3 is superimposed on the voltage across the wire network established by the power supply 36.

During normal operation, the IR transmitters and receivers of the detector unit 4 are disabled. Most of the time, they serve no purpose. The detector unit 4 simply needs to communicate with the central control unit 2. Not only would the IR receiver and transmitter 11, 12 drain a considerable amount of power over a long period of time, but they would also pose a security risk if they were enabled since it might be possible for someone to gain access to the processor of the detector unit 4, or for background IR signals from other devices to cause interference with the detector unit 4. However, from time to time, it is necessary for the detector unit 4 to be accessed directly, when connecting via the IR link is important. For security reasons, before a person connects using the remote communication device 5, the person must first enable the IR receiver 11 and transmitter 12 from the central control unit 2. The central control unit 2 offers security on this feature such that only authorised personnel are able to enable the IR receiver and transmitter 11, 12. The central control unit 2 directs an enablement signal through the wire network 3 via the protocol encoder 33 and loop driver 35 to the detector unit 4. This enable signal might apply to a single detector unit, or to all detector units within the system or circuit. The IR enablement signal is received by the detector unit 4 via the network 3 such that the signal enters via the network data port 7 and passes through the wired network input filter 8 and the multiplexer/demultiplexer 10 so as to be received by the processor unit 13. On receiving the IR enablement signal, the processor unit 13 outputs a '1' signal on the commissioning mode enable line to the AND gate, and causes the IR receiver 11 and IR transmitter 12 to be powered. A person may then operate the remote communication device 5 directing signals from it from its own IR transmitter towards the detector unit 4. The data signal will be received by the IR receiver 11, and detection of an IR signal is communicated by the IR communication or carrier detector 14 to the other input of the AND gate, where upon a positive chip select signal C is directed to the multiplexer/demultiplexer 10 for a period of 2 seconds. This chip select signal causes the multiplexer/demultiplexer 10 to transfer data from the IR receiver 11 to the processor unit 13 in preference to any data received via the network data port 7 from the network 3. It also directs any data from the processor unit 13 out through the IR transmitter 12 rather than through the network port 7. Thus, the chip select signal controls the routing of output signals, and the source of input signals.

After two seconds without any IR signals being received, the IR communication or carrier detector changes its output to '0', which causes the chip select signal to drop to '0' and the multiplexer to switch so as to communicate with the wired network.

Once the person has finished communicating with the detector unit 4, he will return to the central control unit 2 and switch off the IR receiver 11 and 12 by causing the processor 32 of the central control unit 2 to send a disablement signal through the protocol encoder 33 and the loop driver 35 to the network 3 where it is received by the detector unit 4. The processor unit 13 within the detector unit 4 switches the commissioning mode enable output to zero, thereby switching off the chip select signal C to the multiplexer/demultiplexer 10. The power to the IR receiver and transmitter 11, 12 is also switched off.

It is useful, at this point, to say something about the remote communication device and its use in conjunction with the detector unit. For example, during the commissioning process, in which the system is initially set up for correct functioning, an operator is required to be in a position near to the individual detector units during the commissioning process. During that process, as well as testing the operation of the individual units, the nearby operator will need to identify the location of each unit. Rather than remove the detector units and attach them to a portable tool to carry out operations such as entering the location of the detector into the detectors memory, the present invention allows this to be done remotely without removing the detector unit from its mounting point. The keypad 21 of the remote communication device 5 can be used to enter data, such as the location of the detector unit, or any other appropriate information which can then be sent to the detector unit 4 to be entered into memory. The display 20 of the remote communication device 5 might be used to display data which is transmitted from the detector unit 4 to the remote communication device 5. The processor unit 19 receives IR data which has been received by the receiver 17, and transmits data to the IR transmitter 18 so as to be directed to the detector unit 4. The processor unit 19 is able to decode the received signals into a form that it is able to understand, and encodes outgoing data into a form which can be transmitted via the IR transmitter 18. Likewise, the processor unit 13 is able to decode incoming signals and encode outgoing signals for transmission to the remote communication device 5. Significantly, communications between the detector unit 4 and the central control unit 2 are encoded in the same way, despite the fact that communications between the detector unit 4 and the central control unit 2 are transmitted via a wire network 3 rather than the IR link between the detector unit 4 and the remote communication device 5. This is a very surprising arrangement since it is expected that you would need to have different data transmission protocols depending on the means of communication. One would expect the IR link to have a very slow transmission rate, and to have completely different characteristics to the communication over the wire network 3. However, it has been found that the same protocol can be used for both. This offers several advantages in that the processor unit 13 in the detector unit 4 only needs to have a single protocol encoder/decoder, and does not need to have a separate one for each means of communication. This reduces the cost of the processor unit 13 and simplifies the detector unit 4. Since only a single decoder is required within the processor 13, the multiplexer/demultiplexer is important because the processor 13 can only receive data from one of the communication sources at a time, and when the IR communication link is active, the processor unit 13 will be "deaf" to the wired network 3. However, when the IR receiver is not receiving any data, this is detected, and the multiplexer/demultiplexer 10 is switched back to communicating with the wired network 3. The IR communication or carrier detector 14 which detects whether there are IR signals being received could operate in a number of different ways, for example by detecting wireless data packets or a preamble, or the header of a particular type of wireless packet. In effect, the multiplexer/demultiplexer is a switch.

While the IR receiver 11 is active, it could pick up IR signals from other sources which are nearby, such as powerful light sources, strobes, or remote control devices for televisions. These could cause the detector unit to erroneously believe that it is being communicated with, hence preventing communication from passing to and from the detector unit via the wired network 3. This is why the IR mode of operation is only enabled when an operator with the appropriate security access level enables the IR mode from the central control unit 2. However, while the IR mode is enabled, another IR source could interfere with the detector unit by the continued presence of IR activity beyond what is expected. The present invention employs a watchdog time out system based on a timer and triggered by a continued presence of IR activity beyond what is expected for a period. The central control unit can be arranged to send an additional enablement command signal to the detector unit every, say, 10 or 20 seconds. Since the processor unit is 'deaf' to the central control unit while it is receiving IR data, if this additional enablement command isn't received by the unit on, say, four consecutive occasions, this will indicate that the IR receiver is being interfered with by a background source of IR activity, and the IR mode can be switched off. This can be carried out by the processor unit, which would switch the commissioning mode enable line to '0'.

Another possibility is for the detector unit to have a test function to test for unwanted sources of IR activity, so setting an input for enabling the IR communication parts. The IR circuit will be activated, but the multiplexer will be set to keep the detector in Loop mode only, and the output that drove the C input (of the multiplexer/demultiplexer) is instead routed to an input on the processor which can be interrogated by the panel, thus determining if there is unwanted IR activity before the IR link is actually activated. Conveniently, an 'unwanted IR activity' report for all units on the loop can quickly be generated and indicated at the panel to the user at the time of IR enablement. The central control unit 2 will interrogate the IR receiver 11 (using a further command), confirming that there is no unwanted IR activity before sending the command to enable the IR communication mode.

The operation of the invention will now be described. Let us assume that the system has just been installed and is in the process of being commissioned. The commissioning process involves checking each of the detectors, and entering into the memory of each detector the location of that detector. The operator begins at the central control unit 2 by instructing the central control unit to place the detectors in IR mode such that the IR receivers and transmitters 11, 12 are enabled. This will require the operator to identify themselves as having sufficient security clearance to carry out that action.

The operator will then approach a detector unit 4 with the remote communication device 5 such that the remote communication device 5 is caused to emit an initiation signal from the IR transmitter 18. The detector unit 4 receives that signal, and recognises it as a system signal, where upon the IR communication or carrier detector 14 passes a signal to the AND gate so as to direct the multiplexer/demultiplexer 10 to pass the initiation signal to the processor 13. This establishes communication between the remote communication device 5 and the detector unit 4. The processor unit 13 sends a handshake signal which is directed by the multiplexer/demultiplexer 10 to the IR transmitter 12 which transmits it to the IR receiver 17 of the remote communication device 5. This establishes communication between the two devices. The remote communication device can then call for the data which appears within the memory of the detector unit corresponding to the location of the detector unit. This information is sent to the remote communication device, where it is displayed on the display 20. If the operator wishes to change the location of the unit recorded in its memory, he can edit it using the keypad 21 and return it to the detector unit 4 via the IR link so as to update the field within the memory of the detector unit 4.

The operator could also carry out various other operations, such as initiating test modes, if he wishes. When the operator is finished, he ends communication with the detector unit and returns to the central control unit where he causes an IR mode disablement signal to be sent to the detector, which then ends the IR mode. This command could also be sent from the remote tool itself.

It will be appreciated that, in certain circumstances, a number of detector units may be positioned close together, and that, when the operator sends the initiation signal to the detector unit 4 that he intends to communicate with, several detector units may receive that initiation signal and return handshakes. One way in which the operator is able to discriminate between the detector units is where the handshake signals from each of the detector units are unique, perhaps including the address or the unique serial number of the detector unit. These could then be displayed on the display 20 of the remote communication device 5, and the operator can select the one which he wishes to communicate with.

Alternatively, instead of the handshake signal being one which is sent from the IR transmitter 12 of the detector unit, it could be directed to the visual indicator 16, such as a flashing LED. If the LEDs of each device are arranged such that they will flash at different times, the operator can select the detector that he is interested in communicating with simply by making a selection on the remote communication device 5 when the detector unit he wishes to communicate with flashes. This may require a software algorithm to be in place such that, when the detector units 4 send their handshake signals, they are sent at different times. Alternatively, the time at which the handshake signal is sent may be pre-programmed.

There is also a potential for applying the existing collision arbitration algorithm, based on a GLOBAL command. If one detector can determine if another is in the process of transmitting a signal to the remote device, that unit can hold off sending its own message until it can determine the first has finished sending its message. To accomplish this, the remote tool will have to send out an IR signal as soon as it receives one, so it acts like a mirror such that each detector within IR link range will see the activity from the other detectors within range. This assumes the detectors have already been programmed with unique ID addresses.

Alternatively, or if the units in range are programmed with the same (default) ID address: an auto addressing function can be used, the remote tool can attempt to communicate with individual detectors quickly using selected serial number values. Any clashed replies will be identified as a collision and the next level of serial addressing will be invoked, until all detectors are individually identified. This technique does not require the remote tool to act like a mirror. In this patent specification the embodiments described have two-way IR communication between the detector unit 4 and the remote communication device 5. In other embodiments, the IR link may be one way such that the detector unit only includes an IR receiver 11, and no IR transmitter 12. The visual indicator 16 becomes important since the operator will need to know whether the detector unit has received or implemented the commands sent to the detector unit from the remote communication device 5. This means that the remote communication device 5 only requires an IR transmitter 18, and no IR receiver 17. Clearly, the functionality of the system is reduced if the IR link between them is only one way.

Figure 4:
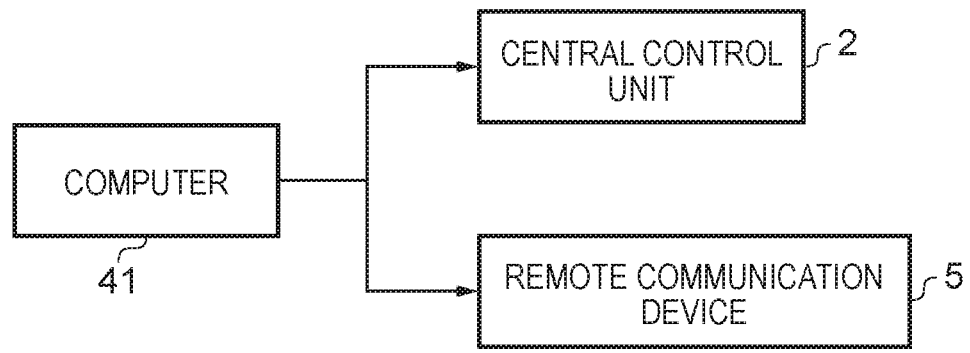
FIG. 4 is a block diagram showing one way of connecting a computer to the system.
Figure 5:
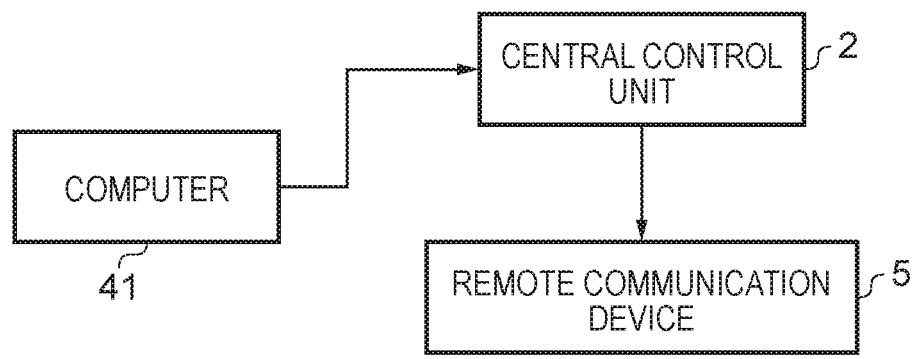
FIG. 5 is a block diagram showing another way of connecting a computer to the system.

A further embodiment in which the whole or a part of a detector system is commissioned will now be described with reference to FIGS. 4, 5 and 6. As in the above embodiments, a central control unit 2 is connected via network to a plurality of detector units. The commissioning process requires the use of a computer 41 executing detector system configuration software by which the detector system can be defined. For example, the computer system can allow a user to define the connections from the central control unit 2 to the various detector units, sounders, call points and the like within the system. Each component within the system can be allocated a unique address on the system, the location of each detectors can be identified, and the appropriate properties of each detector unit can be defined, for example sensitivity level and the like. Once the system has been defined by the software running on the computer 41 as configuration data, that configuration data can be downloaded onto the central control unit 2 and the remote communication device 5. This can be downloaded in a number of different ways. In FIG. 4, the computer 41 is shown connected both to the central control unit (2) and to the remote communication device 5 so as to download the configuration data directly. The arrangement shown in FIG. 5, however, shows the configuration data being downloaded from the computer 41 to the central control unit 2, and then being sent from the central control unit 2 to the remote communication device 5.

The commissioning process of this embodiment will now be described in detail with reference to the flow diagram of FIG. 6. The length of the flow diagram is such that the process is spread over six pages. In the flow diagram, the process is divided into four columns representing the action taken by an engineer; by the central control unit 2; by the remote communication device 5; and by the detector unit 4.

In step 61, the installing engineer configures the whole or a part of the detector system on a computer using detector system configuration software executing on the computer 41. Once complete, he downloads the configuration in the form of configuration data to the central control unit 2 in step 62, and to the remote communication device 5 in step 63, these steps corresponding to the arrangement shown in FIG. 4. If the arrangement of FIG. 5 is used, the configuration data is downloaded to the remote communication devices by the central control unit 2.

The engineer will then prepare to test the commissioning of each detector unit 4 by placing the system in a test mode in step 67 and 68 by switching the IR mode on at the central control unit 2. The central control unit 2 will send an "IR mode ON" command to the required section or loop of the detector system every five seconds, or where the whole system is being commissioned for the first time, to the whole system. This takes place in step 69. The "IR mode ON" command is sent to the relevant detector units 4, and in step 70, each of those detector units 4 receives the signal and enters its IR mode.

The engineer will take the remote communication device 5 and place it in commissioning mode in step 51. In step 52, the remote communication device will check all devices within the configuration data of the detector system to identify those which have not been commissioned. If it finds devices which require configuration (step 53), it will display a list of those devices on its screen in step 54. The engineer can then move the remote communication device 5 to those detectors which have not yet been commissioned (step 55).

When the engineer reaches one of the devices from the list on the remote communication device 5, he will select that device from the list on the remote communication device 5 in step 71. This causes the remote communication device 5 to start communicating with the detector unit 4. The detector unit 4, which has not been commissioned, contains a default address which must be changed to its final commissioned address which is defined by the configuration created by the engineer in step 61. In step 72, the remote communication device 5 sends the new address of the detector unit 4 to the detector unit 4 via the IR transmitter. Step 73 achieves a handshake in which the detector unit 4 transmits by its IR transmitter the address that it has now been programmed with. The remote communication device 5 compares this, in step 74, with the correct address, and if correct re-addressing has failed, the device is not commissioned in step 75, and the engineer retries to set the devices address, in step 76, for a few number of times. Once the address has been correctly placed in the detector unit 4, the remote communication device causes the detector unit 4 to be switched on, and, in step 78, this raises its power-up flag using the new address. This power-up flag is detected by the central control unit 2 in step 80, which then initialises the device with point and zone information. This tells the detector where it is located both within the building or environment it is located, and within the detector system. Therefore, it includes information on which circuit the detector unit is located as well as what room the detector is located in. Other configuration information may be transmitted to the detector unit 4, such as the sensitivity level that is to be used. This configuration data is stored in the memory of the detector unit 4 in step 82.

From step 83, the detector device 5 is maintained in IR mode, and in step 84, the detector unit 4 is asked to supply the configuration data it has received from the central control unit 2 by the remote communication device 5. This is requested via the IR link, and the data is sent via the IR link and is displayed on the remote communication device 5 in step 86. In step 87, this is compared with the configuration data of that detector 4 that is already stored in the remote communication device 5. If it is confirmed to be correct, this is recorded in a log in step 88, and the engineer is requested by the remote communication device 5 to test the detector unit 4. The engineer then indicates in step 90 if he will conduct the test, and on the assumption that he will, he follows the test instructions in step 91 and in step 92, and steps 93 and 94 the results of the various tests are displayed or recorded. The engineer records the results in step 95, and the central control unit processes the results in a log in the central control unit in step 96. The record of the results is made in a log in the remote communication device in step 97. If the device fails the test, or requires a change in the configuration, the engineer will make an entry of this kind in the log within the remote communication device 5 at this point. To facilitate this, the remote communication device 5 includes a QWERTY keypad. Once commissioning is complete, a message is displayed in step 96 to that effect and information concerning the time and date of the commissioning process is entered into the log-in step 99.

Once each detector unit 4 has been commissioned, the engineer returns to the computer 41 and activates a reporting function within the software in step 101. The engineer connects the remote communication device 5 to the computer in step 102 and loads the reporting application software 103 on the computer. The engineer and the reporting application go through various steps to import the commissioning data files to create a report in step 108. If the configuration of a detector unit 4 needs to be changed, as noted by the engineer during the commissioning process, he will make these changes to the configuration software on the computer 41, and repeat a number of the steps that he has taken during his first test. He will download the updated configuration data onto the central control unit 2 and the remote communication device 5, and will return to the detector unit 4 to do a re-test. Once this is satisfactory, the commissioning process is complete.

The remote communication device 5 can be enhanced such that, if any changes to the configuration are required, they can be made during the commissioning process, while the engineer is using the device to communicate with the detector 4. He can use the device 5 to change the configuration, and this updates the configuration data on the remote communication device 5 as well as in the detector unit. At the end of the configuration process, when he returns to the computer 41, the change in configuration of the detector unit 4 is imported into the configuration software running on the computer 41, and this updated configuration is then downloaded onto the central control unit so that it is updated so as to correspond exactly with the configuration data of the detector unit.

List of Steps in FIG. 6

51 Place remote communication device 5 in commissioning mode
52 Check device list for devices which have not been commissioned
53 Decision box to identify if any devices have not yet been commissioned on the system
54 Display list of devices
55 Walk to detector location
61 Configure configuration software on computer
62 Download configuration from software onto central control unit
63 Download configuration of system to remote communication device
64 Initialise and configure any detector units not already set up
65 Store configuration into memory
66 Raise any faults due to missing/non-addressed detector units
67 Enable walk test mode for detectors which are to be commissioned
68 Place central control unit into IR mode for required loop(s)
69 Central control unit sends "IR mode ON" command to required loop(s) every five seconds
70 Device switches on IR circuitry
71 Select the device from the list on the remote communication device.
72 Send new address to device via IR link if device has default address
73 Confirm address which has been programmed into device
74 Decision box to identify if address has been correctly programmed into detector unit
75 Make note that device is not commissioned
76 Engineer tries this for a few number of times
77 Raise the power-up flag of the detector unit over the IR link
78 Device resets and raises its power-up flag. The detector unit uses the new address.
79 Display a message to the user informing them that the device is being configured
80 Panel detects power up flag for device with programmed address
81 Initialises the device with point/zone information and seals it over loop
82 Store configuration into memory
83 Device remains in IR mode
84 Request the device information for this address over the IR link
85 Send device information over the IR link
86 Display the device information, remote communication device will confirm automatically
87 Decision box as to whether confirmation passes or fails
88 An entry is made in the log against this point to show that it is correct
89 A message is displayed asking the user to test the device
90 Decision box for the engineer to decide whether to conduct test
91 User follows test instructions
92 User tests the device using no-climb and gas/co heat
93 Central control unit detects a fire and the device being tested. Lights fire LED on device
94 A message is displayed asking the user if the test passed or failed
95 User indicates on the remote communication device if the test passed or failed
96 Process any groups/actions and make entry into the log of the central control unit
97 An entry is made in the log against this point to indicate the status of the test
98 A message is displayed indicating that the commissioning of this device is complete
99 An entry is made in the log indicating the time and date of commissioning complete
100 The main menu is displayed
101 User activates reporting function
102 User plugs remote communication device into computer
103 User loads reporting application
104 Asks the user to identify the correct data log files to use
105 Selects the data files
106 Asks the user which type of report they require
107 User detects "commissioning report"
108 Uses a combination of the remote communication device and the configuration data files to create the report
109 End While this invention has been particularly shown and described with references to preferred embodiments thereof, it will be understood by those skilled in the art that various changes in form and details may be made therein without departing from the scope of the invention encompassed by the appended claims.

The invention claimed is:

1. An active unit of a networked detector system, comprising:
   a protocol decoder;
   a network port for a wired connection to a central control unit;
   an optical data input port for a wireless connection to a remote communication device, the optical data input port arranged to receive optical data;
   a multiplexer which receives data both from the network port and from the optical data input port and passes the data to the protocol decoder, wherein the multiplexer assigns a higher priority to data received from the optical data input port than from the network port, and wherein the protocol decoder is arranged to decode data from both the network port and the optical data input port.

2. The active unit according to claim 1, wherein the optical data input port is an infra-red port.

3. The active unit according to claim 1, further comprising a processor which operates on the decoded data from the protocol decoder.

4. The active unit according to claim 3, wherein the protocol decoder is part of the processor.

5. The active unit according to claim 1, further comprising an optical data output port arranged to transmit optical data and a demultiplexer which is arranged to receive data from the protocol decoder and to pass the received data to the network port or the optical data output port.

6. The active unit according to claim 5, wherein the optical data input port and the optical data output port form an optical data port.

7. A detector system comprising:
an active unit according to claim 1;
a remote communication device including an optical data output port arranged to transmit optical data, and a protocol encoder which generates optical data to be sent to the active unit.

8. The detector system according to claim 7, wherein the optical data output port is an IR port.

9. The detector system according to claim 7, wherein the remote communication device includes an optical data input port arranged to receive optical data.

10. The detector system according to claim 7, wherein the active unit is a detector unit, including one or more of:
a smoke detector;
a flame detector;
a heat detector; and
a movement detector.

11. The detector system according to claim 7, wherein the active unit is any one of:
an isolator unit;
a switch;
a sounder;
a warning beacon.

12. A method of commissioning an active unit of a detector system, comprising:
placing at least a part of the system in a commissioning mode, which causes optical data ports of the active units placed in the commissioning mode to be enabled, wherein placing at least a part of the system in a commissioning mode comprises a central control unit directing an enablement signal through a wire network to the active units to be placed in the commissioning mode and the active units enabling the optical data ports in response to receiving the enablement signal;
moving a remote communication device to an active unit to be commissioned; and
operating the remote communication device to communicate with the active unit and thereby to commission that active unit.

13. The method according to claim 12, further comprising switching off the commissioning mode.

14. The method according to claim 12, further comprising creating a configuration of the detector system to create configuration data; and passing the configuration data to a central control unit, and to the remote communication device.

15. The method according to claim 12, wherein during normal operation, the optical data ports of the active units are disabled.

16. The method according to claim 12, wherein the central control unit only directs the enablement signal to the active units to be placed in the commissioning mode in response to an operator of the central control unit with appropriate security access level enabling commissioning mode.

17. A method of commissioning an active unit of a detector system, comprising:
placing at least a part of the system in a commissioning mode, which causes optical data ports of the active units placed in the commissioning mode to be enabled;
moving a remote communication device to an active unit to be commissioned;
operating the remote communication device to communicate with the active unit and thereby to commission that active unit; and
switching off the commissioning mode, wherein switching off the commissioning mode comprises a central control unit sending a disablement signal through a wire network to the active units in the commissioning mode and the active units disabling the optical data ports in response to receiving the disablement signal.

18. An active unit of a networked detector system, comprising:
a processor;
a network port for a wired connection to a central control unit;
an optical data input port for a wireless connection to a remote communication device, the optical data input port arranged to receive optical data, wherein the optical data input port is disabled during normal operation and enabled during a commissioning mode, and during the commissioning mode, the remote communication device commissions the active unit by communicating with the active unit via the optical data input port; and
a multiplexer which receives data both from the network port and from the optical data input port and passes the data to the processor, wherein the multiplexer assigns a higher priority to data received from the optical data input port than from the network port.

19. A detector system comprising:
a central control unit, which comprises a network port for communicating with one or more active units via a wired network; and
the one or more active units, each comprising a network port for communicating with the central control unit via the wired network and an optical data port for communicating with a remote communication device, wherein the remote communication device is moved to an active unit to be commissioned and operated to communicate with the active unit and thereby commission the active unit,
wherein, when at least part of the system is placed in a commissioning mode, the central control unit directs an enablement signal through the wire network to the active units to be placed in the commissioning mode, and the active units enable the optical data ports in response to receiving the enablement signal.

20. An active unit of a detector system, the active unit comprising:
a network port for communicating with a central control unit of the detector system via a wired network; and
an optical data port for communicating with a remote communication device, wherein the remote communication device is moved to an active unit to be commissioned and operated to communicate with the active unit and thereby commission the active unit, wherein the active unit enables the optical data port in response to receiving an enablement signal, which is directed by the central control unit through the wire network to active units of the detector system to be placed in a commissioning mode when at least part of the system is placed in the commissioning mode.

\* \* \* \* \*